United States Patent
Kerns et al.

(10) Patent No.: US 8,145,409 B2
(45) Date of Patent: Mar. 27, 2012

(54) APPROACH FOR DETERMINING EXHAUST GAS SENSOR DEGRADATION

(75) Inventors: James Michael Kerns, Trenton, MI (US); Timothy Joseph Clark, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 449 days.

(21) Appl. No.: 12/412,182

(22) Filed: Mar. 26, 2009

(65) Prior Publication Data

US 2010/0242569 A1 Sep. 30, 2010

(51) Int. Cl.
*B60T 7/12* (2006.01)
(52) U.S. Cl. ......... 701/109; 701/114; 123/688; 123/690
(58) Field of Classification Search .................. 701/109, 701/114; 123/688, 689, 690, 676, 703, 704; 73/114.71–114.73; 60/274, 276, 277, 285
See application file for complete search history.

(56) References Cited

U.S. PATENT DOCUMENTS

| | | | | |
|---|---|---|---|---|
| 4,131,091 A | * | 12/1978 | Asano et al. | 123/682 |
| 4,186,691 A | * | 2/1980 | Takase et al. | 123/325 |
| 4,214,558 A | * | 7/1980 | Nishioka et al. | 123/696 |
| 4,266,274 A | * | 5/1981 | Barman | 701/108 |
| 5,325,711 A | | 7/1994 | Hamburg et al. | |
| 5,672,817 A | | 9/1997 | Sagisaka et al. | |
| 6,581,371 B1 | | 6/2003 | Orzel et al. | |
| 7,021,300 B2 | | 4/2006 | Maki et al. | |
| 7,225,800 B2 | | 6/2007 | Nakagawa et al. | |
| 7,254,474 B2 | | 8/2007 | Iihoshi et al. | |
| 7,886,719 B2 | * | 2/2011 | Thomas | 123/478 |

* cited by examiner

*Primary Examiner* — John Kwon
(74) *Attorney, Agent, or Firm* — Allan J. Lippa; Alleman Hall McCoy Russell & Tuttle LLP

(57) ABSTRACT

A method for determining degradation of an exhaust gas sensor positioned in an exhaust system for an internal combustion engine of a vehicle is provided. The method includes sensor response durations to rich-to-lean and lean-to-rich transitions, as well as the symmetry of sensor response durations and delays to such transitions.

18 Claims, 4 Drawing Sheets

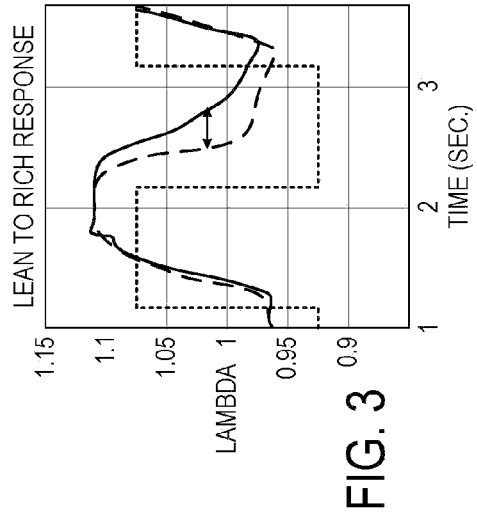
FIG. 2
FIG. 3
FIG. 4
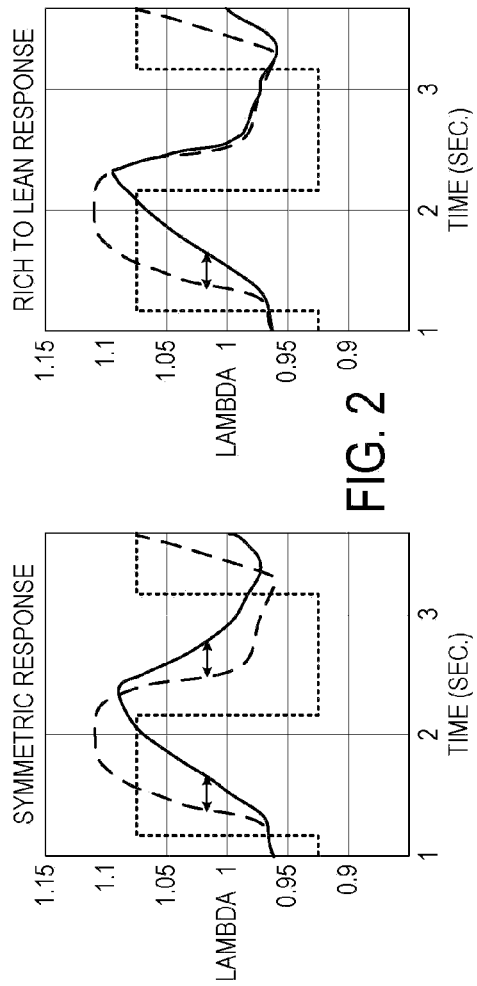
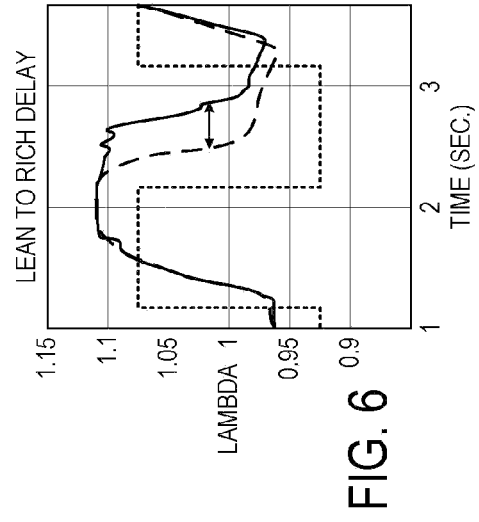
FIG. 5
FIG. 6
FIG. 7
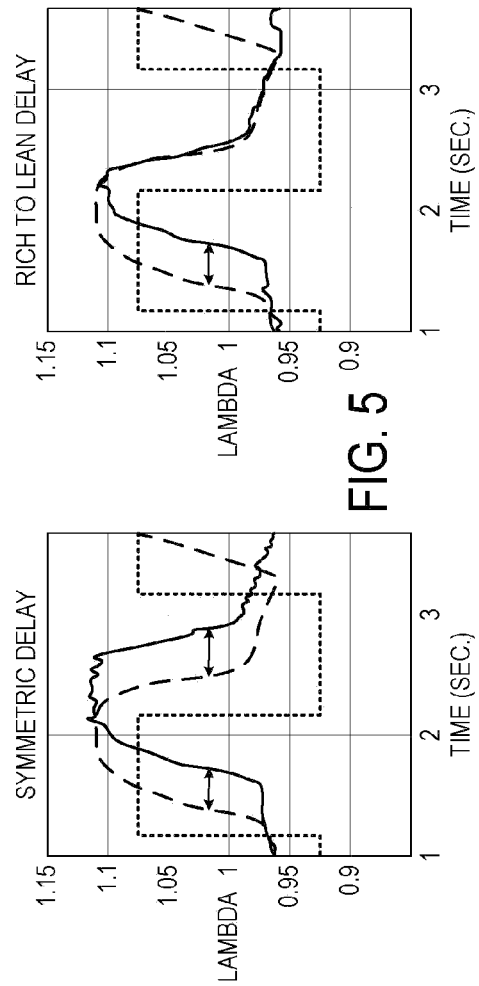

APPROACH FOR DETERMINING EXHAUST GAS SENSOR DEGRADATION

BACKGROUND AND SUMMARY

Typically, an exhaust gas sensor may be positioned in an exhaust system of a vehicle to detect an air/fuel ratio of exhaust gas exhausted from an internal combustion engine of the vehicle. The exhaust gas sensor readings may be used to control operation of the internal combustion engine to propel the vehicle.

Degradation of an exhaust gas sensor may cause engine control degradation that may result in increased emissions and/or reduced vehicle drivability. Accordingly, accurate determination of exhaust gas sensor degradation may reduce the likelihood of engine control based on readings from a degraded exhaust gas sensor. In particular, an exhaust gas sensor may exhibit six discreet types of degradation behavior. The degradation behavior types may be categorized as asymmetric type degradation (e.g., rich-to-lean asymmetric delay, lean-to-rich asymmetric delay, rich-to-lean asymmetric slow response, lean-to-rich asymmetric slow response) that affects only lean-to-rich or rich-to-lean exhaust gas sensor response rates, or symmetric type degradation (e.g., symmetric delay, symmetric slow response) that affects both lean-to-rich and rich-to-lean exhaust gas sensor response rates. The delay type degradation behaviors may be associated with the initial reaction of the exhaust gas sensor to a change in exhaust gas composition and the slow response type degradation behaviors may be associated with a duration after an initial exhaust gas sensor response to transition from a rich-to-lean or lean-to-rich exhaust gas sensor output.

The inventors herein have recognized the above issues and identified an approach for determining exhaust gas sensor degradation from an exhaust gas sensor response duration parameter based on recognition of any one of the six degradation behaviors types described above. In one example, the approach may include an embodiment of a method for determining degradation of an exhaust gas sensor positioned in an exhaust system for an internal combustion engine of a vehicle is provided. The method may include modulating an air/fuel ratio of gas exhausted by the internal combustion engine to the exhaust system through a cycle that includes at least one rich-to-lean transition and at least one lean-to-rich transition, indicating a degradation condition of the exhaust gas sensor in response to at least one of a rich-to-lean response duration of the exhaust gas sensor and a lean-to-rich response duration of the exhaust gas sensor being greater than a delay threshold, and indicating the degradation condition of the exhaust gas sensor in response to a ratio of the rich-to-lean response duration to the lean-to-rich response duration being greater than an asymmetry threshold that is relative to an axis of symmetry of the rich-to-lean response duration versus the lean-to-rich response duration.

By determining degradation of an exhaust gas sensor due to one or more of the six discreet degradation behavior types, the accuracy of exhaust gas sensor degradation determination may be improved. Moreover, by using a single response duration parameter to act as a pass/fail metric for determining degradation of the exhaust gas sensor, exhaust gas sensor degradation monitoring may be performed in a simple manner. In this way, engine control may be adjusted responsive to indication of degradation of an exhaust gas sensor to reduce the impact on vehicle drivability and/or emissions due to exhaust gas sensor degradation.

BRIEF DESCRIPTION OF THE DRAWINGS

FIG. 2 shows a graph indicating a symmetric response type degradation behavior of an exhaust gas sensor.

FIG. 3 shows a graph indicating an asymmetric rich-to-lean response type degradation behavior of an exhaust gas sensor.

FIG. 4 shows a graph indicating an asymmetric lean-to-rich response type degradation behavior of an exhaust gas sensor.

FIG. 5 show a graph indicating a symmetric delay type degradation behavior of an exhaust gas sensor.

FIG. 6 shows a graph indicating an asymmetric rich-to-lean delay type degradation behavior of an exhaust gas sensor.

FIG. 7 shows a graph indicating an asymmetric lean-to-rich delay type degradation behavior of an exhaust gas sensor.

DETAILED DESCRIPTION

The following description relates to an approach for determining degradation of an exhaust gas sensor. More particularly, the systems and methods described below may be implemented to determine exhaust gas sensor degradation based on recognition of any one of six discreet types of behavior associated with exhaust gas sensor degradation.

Figure 1:
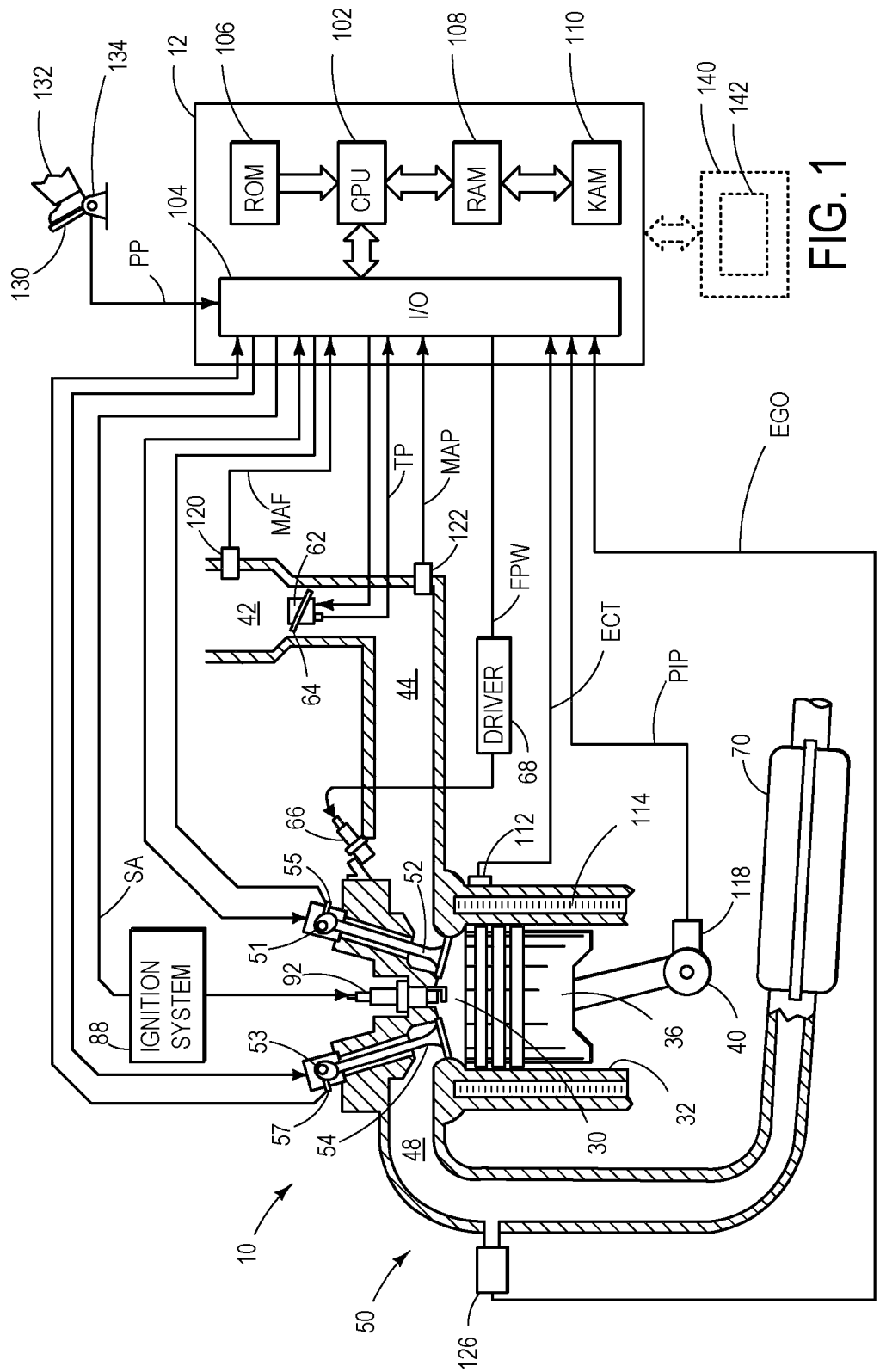
FIG. 1 shows a schematic diagram of an embodiment of a propulsion system of a vehicle including an exhaust gas sensor.

FIG. 1 is a schematic diagram showing one cylinder of multi-cylinder engine 10, which may be included in a propulsion system of a vehicle in which an exhaust gas sensor 126 may be utilized to determine an air fuel ratio of exhaust gas produce by engine 10. The air fuel ratio (along with other operating parameters) may be used for feedback control of engine 10 in various modes of operation. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown arranged in intake passage 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 of exhaust system 50 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. In some embodiments, exhaust gas sensor 126 may be a first one of a plurality of exhaust gas sensors positioned in the exhaust system. For example, additional exhaust gas sensors may be positioned down stream of emission control 70.

Emission control device 70 is shown arranged along exhaust passage 48 downstream of exhaust gas sensor 126. Device 70 may be a three way catalyst (TWC), NOx trap, various other emission control devices, or combinations thereof. In some embodiments, emission control device 70 may be a first one of a plurality of emission control devices positioned in the exhaust system. In some embodiments, during operation of engine 10, emission control device 70 may be periodically reset by operating at least one cylinder of the engine within a particular air/fuel ratio.

For example, engine 10 may be operated in a deceleration fuel shut off (DFSO) operating mode where fuel is shut off to one or more cylinders of engine 10 periodically during deceleration to load emission control device 70 with oxygen to oxidize CO and HC in the emission control device 70. When transitioning into and out of DFSO operating mode, the air/fuel ratio produced by engine 10 may transition from rich to lean and lean to rich, respectively. During such transitions, a method for determining exhaust gas sensor degradation, described in further detail below with reference to FIG. 9 may be performed. By performing the method during DFSO transitions, the exhaust gas sensor degradation determination may be performed in a manner that is not intrusive so as to reduce the impact on drivability of the vehicle.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Furthermore, at least some of the above described signals may used in the exhaust gas sensor degradation determination method described in further detail below. For example, the inverse of the engine speed may be used to determine delays associated with the injection—intake—compression—expansion—exhaust cycle. As another example, the inverse of the velocity (or the inverse of the MAF signal) may be used to determine a delay associated with travel of the exhaust gas from the exhaust valve 54 to exhaust gas sensor 126. The above described examples along with other use of engine sensor signals may be used to determine the time delay between a change in the commanded air fuel ratio and the exhaust gas sensor response rate.

In some embodiments, exhaust gas sensor degradation determination may be performed in a dedicated controller 140. Dedicated controller 140 may include processing resources 142 to handle signal-processing associated with production, calibration, and validation of the degradation determination of exhaust gas sensor 126. In particular, a sample buffer (e.g., generating approximately 100 samples per second per engine bank) utilized to record the response rate of the exhaust gas sensor may be too large for the processing resources of a powertrain control module (PCM) of the vehicle. Accordingly, dedicated controller 140 may be operatively coupled with controller 12 to perform the exhaust gas sensor degradation determination. Note that dedicated controller 140 may receive engine parameter signals from controller 12 and may send engine control signals and degradation determination information among other communications to controller 12.

Note storage medium read-only memory 106 and/or processing resources 142 can be programmed with computer readable data representing instructions executable by processor 102 and/or dedicated controller 140 for performing the methods described below as well as other variants.

As discussed above, exhaust gas sensor degradation may be determined based on any one, or in some examples each, of six discreet behaviors indicated by delays in the response rate of air/fuel ratio readings generated by an exhaust gas sensor during rich-to-lean transitions and/or lean-to-rich transitions. FIGS. 2-7 each show a graph indicating one of the six discreet types of exhaust gas sensor degradation behaviors. The graphs plot air/fuel ratio (lambda) versus time (in seconds). In each graph, the dotted line indicates a commanded lambda signal that may be sent to engine components (e.g., fuel injectors, cylinder valves, throttle, spark plug, etc.) to generate an air/fuel ratio that progresses through a cycle comprising one or more lean-to-rich transitions and one or more rich-to-lean transitions. In each graph, the dashed line indicates an expected lambda response time of an exhaust gas sensor. In each graph, the solid line indicates a degraded lambda signal that would be produced by a degraded exhaust gas sensor in response to the commanded lambda signal. In each of the graphs, the double arrow lines indicate where the given degradation behavior type differs from the expected lambda signal.

FIG. 2 shows a graph indicating a first type of degradation behavior that may be exhibited by a degraded exhaust gas sensor. This first type of degradation behavior is a symmetric response type that includes slow exhaust gas sensor response to the commanded lambda signal for both rich-to-lean and lean-to-rich modulation. In other words, the degraded lambda signal may start to transition from rich-to-lean and lean-to-rich at the expected times but the response rate may be lower than the expected response rate, which results in reduced lean and rich peak times.

FIG. 3 shows a graph indicating a second type of degradation behavior that may be exhibited by a degraded exhaust gas sensor. The second type of degradation behavior is an asymmetric rich-to-lean response type that includes slow exhaust gas sensor response to the commanded lambda signal for a transition from rich-to-lean air/fuel ratio. This behavior type may start the transition from rich-to-lean at the expected time but the response rate may be lower than the expected response rate, which may result in a reduced lean peak time. This type of behavior may be considered asymmetric because the response of the exhaust gas sensor is slow (or lower than expected) during the transition from rich-to-lean.

FIG. 4 shows a graph indicating a third type of degradation behavior that may be exhibited by a degraded exhaust gas sensor. The third type of behavior is an asymmetric lean-to-rich response type that includes slow exhaust gas sensor response to the commanded lambda signal for a transition from lean-to-rich air/fuel ratio. This behavior type may start the transition from lean-to-rich at the expected time but the response rate may be lower than the expected response rate, which may result in a reduced rich peak time. This type of behavior may be considered asymmetric because the response of the exhaust gas sensor is only slow (or lower than expected) during the transition from lean-to-rich.

FIG. 5 shows a graph indicating a fourth type of degradation behavior that may be exhibited by a degraded exhaust gas sensor. This fourth type of degradation behavior is a symmetric delay type that includes a delayed response to the commanded lambda signal for both rich-to-lean and lean-to-rich modulation. In other words, the degraded lambda signal may start to transition from rich-to-lean and lean-to-rich at times that are delayed from the expected times, but the respective transition may occur at the expected response rate, which results in shifted lean and rich peak times.

FIG. 6 shows a graph indicating a fifth type of degradation behavior that may be exhibited by a degraded exhaust gas sensor. This fifth type of degradation behavior is an asymmetric rich-to-lean delay type that includes a delayed response to the commanded lambda signal from the rich-to-lean air/fuel ratio. In other words, the degraded lambda signal may start to transition from rich-to-lean at a time that is delayed from the expected time, but the transition may occur at the expected response rate, which results in shifted and/or reduced lean peak times. This type of behavior may be considered asymmetric because the response of the exhaust gas sensor is only delayed from the expected start time during a transition from rich-to-lean.

FIG. 7 shows a graph indicating a sixth type of degradation behavior that may be exhibited by a degraded exhaust gas sensor. This sixth type of behavior is an asymmetric lean-to-rich delay type that includes a delayed response to the commanded lambda signal from the lean-to-rich air/fuel ratio. In other words, the degraded lambda signal may start to transition from lean-to-rich at a time that is delayed from the expected time, but the transition may occur at the expected response rate, which results in shifted and/or reduced rich peak times. This type of behavior may be considered asymmetric because the response of the exhaust gas sensor is only delayed from the expected start time during a transition from lean-to-rich.

Note an asymmetric degradation behavior may increase the measured response for both directions (i.e., rich-to-lean and lean-to-rich). This effect may become more pronounced as the magnitude of an asymmetric degradation increases. To at least partially compensate for this, a multiplier on the slew time may be applied. The slew time will be discussed in further detail below with reference to method 800 in FIGS. 8 and 9.

It will be appreciated that a degraded exhaust gas sensor may exhibit a combination of two or more of the above described degradation behaviors. For example, a degraded exhaust gas sensor may exhibit an asymmetric rich-to-lean response degradation behavior (i.e., FIG. 3) as well as an asymmetric rich-to-lean response degradation behavior (i.e., FIG. 6).

Figure 8:
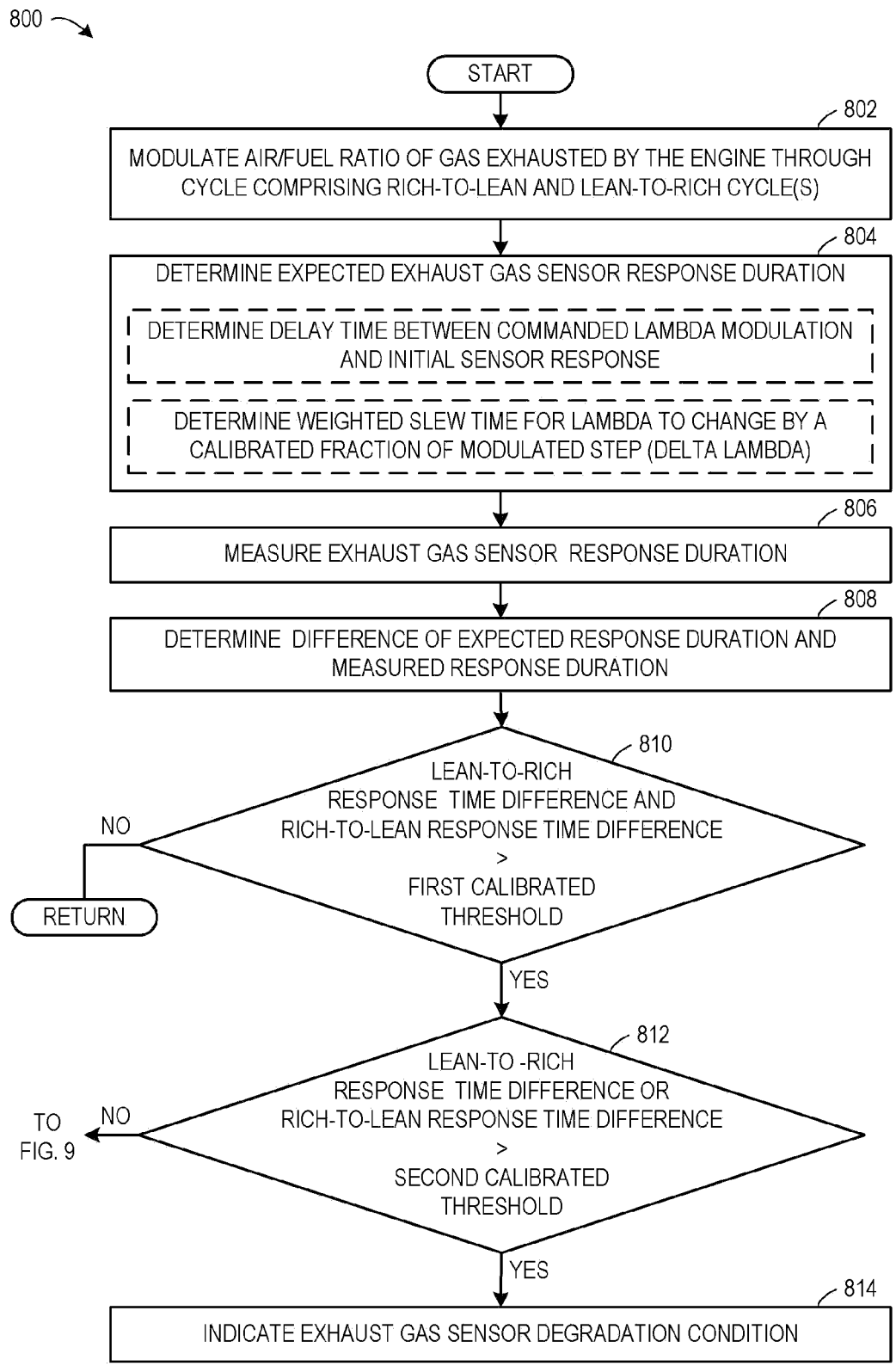
FIGS. 8 and 9 show a flow diagram of an embodiment of a method for determining degradation of an exhaust gas sensor.
Figure 9:
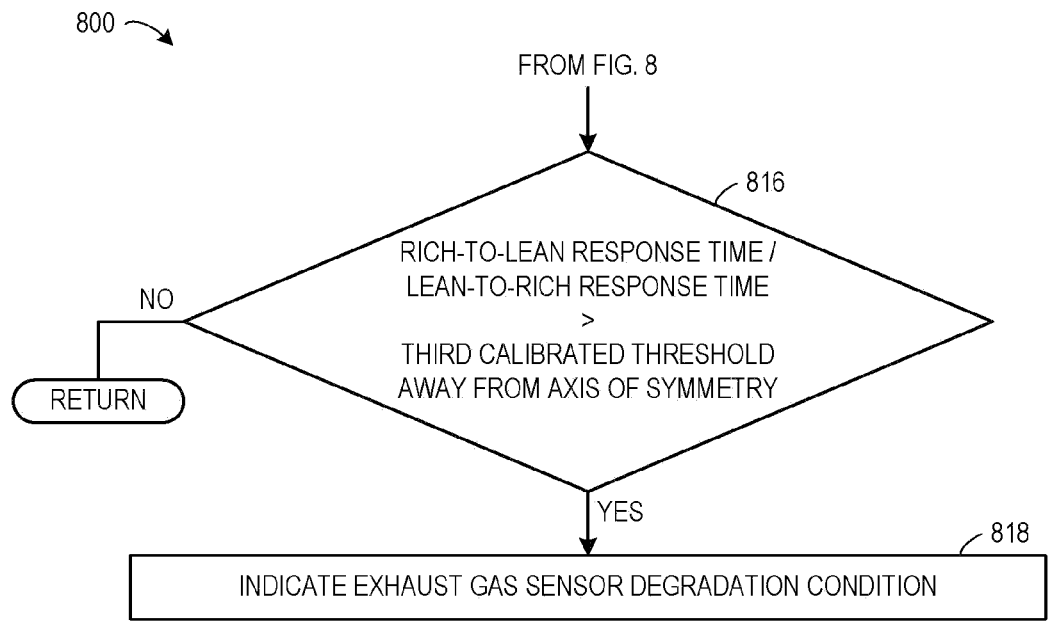

FIGS. 8 and 9 show a flow diagram of an embodiment of a method for determining degradation of an exhaust gas sensor. More particularly, the method 800 may determine an exhaust gas sensor to be degraded based on identification of at least one of the above described six discreet degradation behaviors shown in FIGS. 2-7. That is, method 800 may recognize symmetric and asymmetric delays in initial exhaust gas sensor response as well as symmetric and asymmetric slow response when transitioning from rich-to-lean and/or lean-to-rich that indicate exhaust gas sensor degradation. Typically, method 800 may be performed by a degradation controller, such as dedicated controller 140 of FIG. 1. Dedicated controller 140 may include enough processing resources (e.g., memory) to handle a high sampling rate (e.g., approximately 100 samples per second per bank) of readings from exhaust gas sensor 126. This sampling rate may be suitable to track modulations of the air/fuel ratio from rich-to-lean and lean-to-rich. Further, dedicated controller 140 may send command signals to engine controller 12 to adjust the air/fuel ratio exiting engine 10 in order to determine the functionality of exhaust gas sensor 126. In some embodiments, dedicated controller 140 may be integral with controller 12 and method 800 may be performed by controller 12.

Method 800 may begin at 802, where the method may include modulating the air/fuel ratio of gas exhausted by the engine through a cycle comprising at least one rich-to-lean transition and at least one lean-to-rich transition. As discussed above, control commands may be generated by controller 12 (or by dedicated controller 140 and sent to controller 12) to adjust fuel injection to control fuel entering the cylinders of the engine and/or valve/throttle operation to control air entering the cylinders of the engine. In one example, the commanded air/fuel ratio modulation is an intrusive lambda square wave (e.g., the dotted line in FIGS. 2-7). The air/fuel ratio may be modulated through enough rich-to-lean and lean-to-rich transitions for sufficient response time statistics to be accumulated. For example, the air/fuel ratio may be modulated through six rich-to-lean and lean-to-rich cycles in order to collect a suitable amount of data to make a degradation determination. In one example, to minimize emissions the peak/minimum measured lambda values may be recorded for each cycle and a modulation offset may be calculated based on the average of the peak values. A change in this offset, which is intended to "re-center" the waveform may be applied only when it will result in a larger lambda jump, and/or when the change in offset (moving towards a leaner or richer average) agrees with the output of an outer loop fast integrator (indicating the inner loop is running richer or leaner than a predetermined peak value).

In some embodiments, the air/fuel ratio may be modulated when transition into (entering) or out of (exiting) a DFSO operating mode. By taking advantage of air/fuel ratio modulation in the DFSO operating mode to generate an exhaust gas sensor degradation determination, intrusive air/fuel modulation may be reduced resulting in a reduction or elimination of adverse impacts on emissions and vehicle drivability. Also, the magnitude of the signal (change in sensor output) during the DFSO operating mode may be larger than the intrusive modulation approach which may result in a reduction in noise sensitivity.

Note that during modulation of the air/fuel ratio between rich and lean, if a vehicle operator request to change engine operating conditions is received, the modulation may be suspended until operating conditions are again suitable for determining exhaust gas sensor degradation.

Furthermore, in the case of an engine configuration including two or more cylinder banks (e.g., V-6, V-8, V12, etc.), the air/fuel ratio may be modulated in each cylinder bank to mitigate differences in exhaust gas travel time due to a difference in distance from different banks to the exhaust gas sensor.

At 804, the method may include determining an expected response duration for the exhaust gas sensor to respond to the commanded change in air/fuel ratio. The expected response duration may be determined to be the sum of a duration (delay time) from the commanded change in air/fuel ratio to the initial change in air/fuel ratio as recognized by the exhaust gas sensor and a duration (weighted slew time) for the air/fuel ratio to change by a calibrated amount (delta lambda).

In one example, the expected response duration of the exhaust gas sensor is the sum of a three termed equation (delay) and a two term equation (slew time). The delay time between the change in the commanded air fuel ratio and the initial exhaust gas sensor response may be determined from several sources of delay. First, there is a delay contribution from the injection—intake—compression—expansion—exhaust cycle. This delay contribution may be proportional to the inverse of the engine speed (n). Secondly, there is a delay contribution from the time for the exhaust gas to travel from the exhaust port of the engine cylinders to the exhaust gas sensor. This delay contribution may vary with the inverse of the velocity or air mass flow rate (am) of gas in the exhaust passage. Finally, there are delay contributions induced by processing times, the filtering applied to the exhaust gas sensor signal, and the time required for the filtered exhaust gas sensor signal to change the required delta lambda. These delays are nearly constant. The resulting expression for time delay can be then written as:

$$\text{delay} = a1 + a2/am + a3*1000/n$$

The factor of 1000 is used so the coefficient a3 will be of the same magnitude as the others. Empirical results show that the response is different for each direction (rich-to-lean vs. lean-to-rich) so separate coefficients (a1, a2, a3) may be calculated for each direction as well as for each bank of the engine (in the case of a multi-bank engine).

The weighted slew time may be determined based on velocity of exhaust gas traveling through the exhaust gas sensor. In particular, the velocity of the exhaust gas passing the sensor impacts the rate at which the exhaust gasses are exchanged within the sensor's protection tube and thus, the slew time of the measured lambda signal. The slew time may vary with the magnitude of the step applied. As discussed above, the modulation of the air/fuel ratio may be limited to changes that only allow step size increases to avoid not having a sufficient change in lambda, the modulation events with the larger steps have a steeper lambda and/or a second response. This response may be modeled as the second order system shown above. For this type of system, the duration for the system to respond to a particular fraction of the total response may be nearly constant. By measuring the slew time across a delta lambda (b2) that is a calibrated fraction of the commanded step, a consistent slew time may be achieved even when the step size changes with modulation.

Furthermore, empirical results show that at larger magnitudes of response degradation (e.g., 500 to 800 msec.) the measured response duration for response type degradation behavior may be less than the response duration for delay type degradation behavior of the same magnitude. Also, empirical results show that asymmetric response type degradations tend to increase the measured response duration in the other direction which moves the response time pair (rich to lean and lean to rich) closer to the axis of symmetry (45 degrees on the rich-to-lean vs. lean-to-rich response time plot shown in FIG. 10). This effect becomes more pronounced as the magnitude of an asymmetric response type degradation increases. In order to at least partially compensate for this effect, and to allow for the total measured response duration to be used as a pass/fail metric for a degradation determination, a weighting factor (b1) may be applied to the slew time to increase the measured response time for response type degradation behavior. The slew time is nearly linear with the inverse of the air mass flow rate (am). The resulting equation for the slew time can be then written as:

$$\text{slew time} = b1 + b2/am$$

Empirical results show that the response is different for each direction (rich-to-lean vs. lean-to-rich) so separate coefficients (b1, b2) may be calculated for each direction as well as for each bank of the engine (in the case of a multi-bank engine).

Note that it in some embodiments, degradation determinations may be made based on the delay time and slew time separately. However, this may make it difficult to define calibratible thresholds for combined degradations where there is both delay type degradation behavior and response type degradation behavior.

Continuing with method 800, at 806, the method may include measuring the exhaust gas sensor air/fuel ratio response duration.

At 808, the method may include determining a difference of the expected response duration and the measured response duration. The difference may be determined by subtracting the response duration expected for a nominal sensor from the total response duration and any additional measured response duration is assumed to be due to a change in the exhaust gas sensor response. The differences between the measured and expected responses may be accumulated and averaged over a full cycle of rich-to-lean transitions and lean-to-rich transitions in order to increase the confidence level of the response duration difference as a pass/fail metric for the degradation determination.

At 810, the method may include determining if the average lean-to-rich response time difference and the average rich-to-lean response time difference are greater than a first calibrated threshold. Small variations around the symmetry of the response time difference of a nominal exhaust gas sensor may not have any impact on emissions or drivability. As an example, the first threshold may be calibrated to approximately 200 milliseconds (msec.) which may be the threshold at which asymmetric degradation may begin to affect the stability of engine control resulting in impacts on emissions and drivability. Thus, if the average lean-to-rich response time difference and the average rich-to-lean response time difference are not greater than the first calibrated threshold, it is determined that the exhaust gas sensor is not degraded thus an exhaust gas sensor degradation condition is not indicated, and the method returns to other operation. Otherwise, if the average lean-to-rich response time difference and the average rich-to-lean response time difference are greater than the first calibrated threshold, the method moves to 812.

At 812, the method may include determining if the average lean-to-rich response time difference or the average rich-to-lean response time difference is greater than a second calibrated threshold (a delay threshold). If a delay time or response time in either direction (asymmetric) or both directions (symmetric) is too large (e.g., greater than 600 msec.), it can be assumed that the exhaust gas sensor is degraded and the method moves to 814 where the method may include indicating an exhaust gas sensor degradation condition.

The exhaust gas sensor degradation condition may include setting a diagnostic trouble code in on-board diagnostics of the vehicle. In some embodiments, the on-board diagnostics may be integrated into controller 12. In some embodiments, the on-board diagnostics may be integrated into a separate diagnostics controller (not shown). The diagnostic trouble code may alert a vehicle operator that there is degradation of a vehicle component so that vehicle operator may alter vehicle operation or may have the vehicle serviced to repair or replace the degraded exhaust gas sensor. Further, indicating the degradation condition may include intervention by controller 12 causing engine control to be adjusted away from closed loop air/fuel feedback control to another control strategy, such as open-loop fuel control, for example. Further still, indicating the degradation condition may include limiting operation of the engine or preventing operation of the engine.

Returning to 812, if the average lean-to-rich response time difference or the average rich-to-lean response time difference is not greater than a second calibrated threshold, the method moves to 816 (See FIG. 9).

Figure 10:
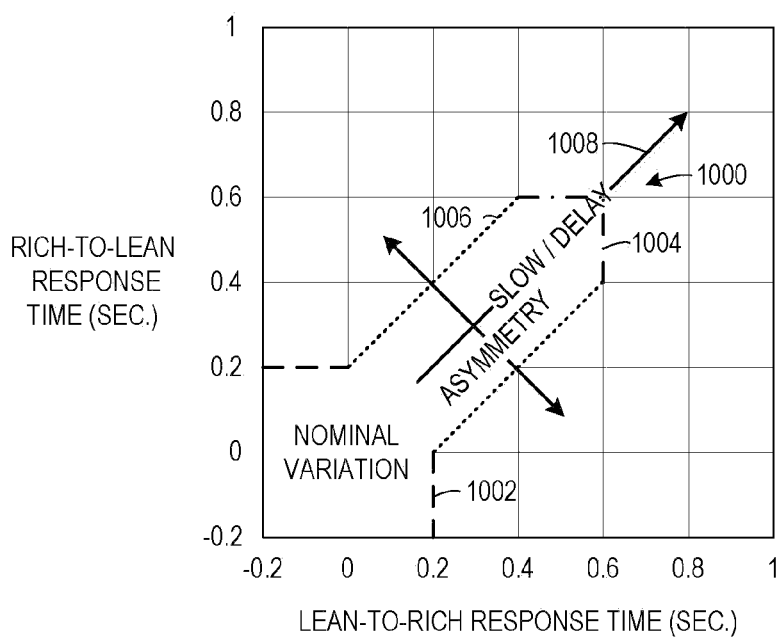
FIG. 10 shows a graph of a no-degradation zone as a function of rich-to-lean response time versus lean-to-rich response time.

At 816, the method may include determining if the ratio of the average rich-to-lean response time difference to the average lean-to-rich response time difference is greater than a third calibrated threshold (an asymmetry threshold) away from the axis of symmetry (45 degrees on the rich-to-lean vs. lean-to-rich response time plot shown in FIG. 10). Empirical results show that symmetric type degradation has little emissions and drivability impact until the control system becomes unstable due to large delays (i.e., response time differences beyond the second calibratible threshold). However, asymmetric type degradation may have significant impact on emissions since it tends to put a "bias" into the air/fuel control. Thus, for intermediate values of the average response time difference (i.e., response time differences between the first calibratible threshold and the second calibratible threshold), it may be determined how much asymmetry is present for a given modulation response cycle. If it is determined that the ratio of the average rich-to-lean response time difference to the average lean-to-rich response time difference is greater than the third calibrated threshold away from the axis of symmetry, the method moves to 818 where the method may include indicating an exhaust gas sensor degradation condition. Otherwise, it is determined that the ratio of the average rich-to-lean response time difference to the average lean-to-rich response time difference is not greater than the third calibrated threshold away from the axis of symmetry, and it is determined that the exhaust gas sensor is not degraded, and an exhaust gas sensor degradation condition is not indicated, and the method returns to other operation.

The above described method may permit a single response duration parameter to be used as a pass/fail metric to determine degradation of an exhaust gas sensor based on six discreet degradation behavior types (e.g., symmetric delay, rich-to-lean asymmetric delay, lean-to-rich asymmetric delay, symmetric slow response, rich-to-lean asymmetric slow response, lean-to-rich asymmetric slow response). By determining degradation of an exhaust gas sensor due to one or more of the six discreet degradation behavior types, exhaust gas sensor degradation monitoring may be made more accurate. Moreover, by using a single response duration parameter to act as a pass/fail metric for determination of degradation of the exhaust gas sensor, exhaust gas sensor degradation monitoring may be performed in a simple manner. Accordingly, an exhaust gas sensor may be determined to be degraded in a simple and accurate manner that may result in reduced impact on emissions and vehicle drivability due to the degraded exhaust gas sensor being undiagnosed.

FIG. 10 shows a graph of rich-to-lean response time plotted against lean-to-rich response time. The graph shows the relationship between rich-to-lean response time difference and lean-to-rich response time difference symmetry, nominal variation and an example no-degradation zone 1000 when plotted as a function of the lean-to-rich response time vs. the rich-to-lean response time. The no-degradation zone 1000 may be the region of the graph in which a response duration of a nominally functioning exhaust gas sensor may lie. The no-degradation zone 1000 may be created by the calibrated thresholds described above in method 800. In particular, the dashed line 1002 represents the boarder of the no-degradation zone created by the first calibrated threshold. The first calibrated threshold may designate both the rich-to-lean and lean-to-rich response durations that are small, to be nominal response times. The dot-dashed line 1004 represents the boarder of the no-degradation zone created by the second calibrated threshold. The second calibrated threshold may designate that either the rich-to-lean or the lean-to-rich response duration differences that are large as response durations of a degraded sensor. The dashed line 1006 represents the boarder of the no-degradation zone created by the third calibrated threshold. The third calibrated threshold is applied relative to the axis of symmetry 1008 of the rich-to-lean response and the lean-to-rich response (45 degree angle of the plot). The third calibrated threshold handles intermediate response duration values that lie between the first calibrated threshold and the second calibrated threshold. The third calibrated threshold acts as a determinant as to which response durations fall too away far from the axis of symmetry 1008 causing an asymmetric degradation type of behavior.

In one particular example, the no-degradation zone may be defined by thresholds calibrated for, and including, each type of the six discreet degradation behavior types. As discussed above, the expected response duration may be defined as the delay time between a commanded air/fuel ratio modulation and the initial sensor response plus the weighted slew time for the measured lambda to change a calibrated amount. By subtracting the response duration expected for a nominal sensor (as a function of engine speed and air mass flow) any additional measured response duration is assumed to be due to a change in the sensor response. The differences between the measured and expected response duration may be accumulated and averaged over six full rich/lean transition cycles. Then, if the average difference between the measured and expected response times is not within calibrated thresholds, the degradation condition may be indicated. As one particular example, the calibrated thresholds for each of the six discreet degradation behavior types are provided in the table below.

| Degradation Type | Threshold |
| --- | --- |
| Symmetric Delay | 700 msec |
| Rich-to-Lean Asymmetric Delay | 600 msec |
| Lean-to-Rich Asymmetric Delay | 700 msec |
| Symmetric Slow Response | >1000 msec |
| Rich-to-Lean Slow Response | 500 msec |
| Lean-to-Rich Slow Response | 800 msec |

As shown in FIG. 10, the diagnostic methods tolerate a greater amount of lean-to-rich and rich-to-lean delay in the sensor under conditions where the two delays have sufficient symmetry (where in the example of FIG. 10, a 45 degree example line is used assuming base response of lean-to-rich and rich-to-lean transitions are equal—clearly other non 1:1 ratios may be used if desired due to sensor characteristics). Similarly, the diagnostic methods tolerate a lesser amount of lean-to-rich and rich-to-lean delay in the sensor under conditions where the two delays do not have sufficient symmetry (e.g., where they have sufficient asymmetry). Thus, as the lean-to-rich response duration and the rich-to-lean response duration become more symmetric, a response duration that does not trigger indication of a degradation condition increases. Correspondingly, as the lean-to-rich response time and the rich-to-lean response time become more asymmetric, a response duration that does not trigger indication of a degradation condition decreases. While either symmetry or asymmetry may be used to characterize the responses, either term can be used interchangeably herein depending on ones point of view.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for determining degradation of an exhaust gas sensor positioned in an exhaust system for an internal combustion engine of a vehicle, comprising:
modulating an air/fuel ratio of gas exhausted by the internal combustion engine to the exhaust gas sensor through at least one rich-to-lean transition and at least one lean-to-rich transition;
indicating a degradation condition of the exhaust gas sensor in response to at least both a delayed response of the exhaust gas sensor to one of the transitions and asymmetry of the exhaust gas sensor response among a rich-to-lean response duration and a lean-to-rich response duration of the exhaust gas sensor;
indicating the degradation condition of the exhaust gas sensor in response to at least one of a rich-to-lean response duration of the exhaust gas sensor and a lean-to-rich response duration of the exhaust gas sensor being greater than a delay threshold; and
indicating the degradation condition of the exhaust gas sensor in response to a ratio of the rich-to-lean response duration to the lean-to-rich response duration being greater than an asymmetry threshold that is relative to an axis of symmetry of the rich-to-lean response duration versus the lean-to-rich response duration.

2. The method of claim 1, wherein the rich-to-lean response duration is the difference of an expected response duration of the exhaust gas sensor and a measured response duration of the exhaust gas sensor.

3. The method of claim 2, wherein the expected response duration is the sum of a delay time duration between a commanded air/fuel ration modulation time and an initial exhaust gas sensor response time and a weighted slew time duration for the air/fuel ratio to change by a calibrated amount.

4. The method of claim 3, wherein the delay time duration is based on an inverse of engine speed and an inverse of mass air flow of gas in the exhaust system.

5. The method of claim 4, wherein the weighted slew time duration is based on an inverse of mass air flow of gas in the exhaust system.

6. The method of claim 5, wherein the calibrated amount is a fraction of an air/fuel ratio modulation step.

7. The method of claim 1, wherein the at least one rich-to-lean transition and at least one lean-to-rich transition comprise a cycle, the cycle including six rich-to-lean transitions and six lean-to-rich transitions, and the rich-to-lean response duration is averaged over the six rich-to-lean transitions and the lean-to-rich response duration is averaged over the six lean-to-rich transitions.

8. The method of claim 1, wherein the delayed response of the exhaust gas sensor to one of the transitions that would cause the degradation condition to be indicated increases as the asymmetry of the exhaust gas sensor response among the rich-to-lean response duration and the lean-to-rich response duration of the exhaust gas sensor decreases.

9. The method of claim 1, wherein modulating the air/fuel ratio occurs during transitions into and out of a deceleration fuel shut off operating mode.

10. The method of claim 1, wherein indicating the degradation condition includes setting a diagnostic trouble code.

11. The method of claim 1, wherein indicating the degradation condition includes intervening in closed loop air/fuel feedback engine control and performing another engine control strategy.

12. A vehicle comprising:
an internal combustion engine that exhausts gas into an exhaust system;
an exhaust gas sensor positioned in the exhaust system to measure an air/fuel ratio of the gas exhausted by the internal combustion engine; and
a controller configured to control the internal combustion engine to modulate the air/fuel ratio of the gas through at least one rich-to-lean transition and at least one lean-to-rich transition, indicate a degradation condition of the exhaust gas sensor in response to at least one of a rich-to-lean response duration of the exhaust gas sensor and a lean-to-rich response duration of the exhaust gas sensor being greater than a delay threshold, and indicate the degradation condition of the exhaust gas sensor in response to asymmetry among the rich-to-lean response duration and the lean-to-rich response duration being greater than an asymmetry threshold that is relative to an axis of symmetry of the rich-to-lean response duration versus the lean-to-rich response duration.

13. The vehicle of claim 12, wherein the internal combustion engine includes two or more cylinder banks, and the air/fuel ratio is modulated in each cylinder bank of the internal combustion engine to determine the rich-to-lean response duration of the exhaust gas sensor and the lean-to-rich response duration for each of the two or more cylinder banks.

14. The vehicle of claim 12, wherein the delay threshold increases as the symmetry increases.

15. The vehicle of claim 12, wherein the rich-to-lean response duration is the difference of an expected response duration of the exhaust gas sensor and a measured response duration of the exhaust gas sensor, and wherein the expected response duration is the sum of a delay time duration between a commanded air/fuel ration modulation time and an initial exhaust gas sensor response time and a weight slew time duration for the air/fuel ratio to change by a fraction of an air/fuel ratio modulation step.

16. The vehicle of claim 12, wherein the exhaust gas sensor is a universal exhaust gas oxygen sensor.

17. A method for determining degradation of an exhaust gas sensor positioned in an exhaust system for an internal combustion engine of a vehicle, comprising:
modulating an air/fuel ratio of gas exhausted by the internal combustion engine to the exhaust system through a cycle comprising at least one rich-to-lean transition and at least one lean-to-rich transition;
indicating a degradation condition of the exhaust gas sensor in response to at least one of a rich-to-lean response duration of the exhaust gas sensor and a lean-to-rich response duration of the exhaust gas sensor being greater than a delay threshold, each of the rich-to-lean response duration and the lean-to-rich response duration being a difference of an expected response duration of the exhaust gas sensor and a measured response duration of the exhaust gas sensor, the expected response duration being the sum of a delay time duration between a commanded air/fuel ration modulation time that is based on engine speed and mass air flow in the exhaust system and an initial exhaust gas sensor response time and a weighted slew time duration for the air/fuel ratio to change by a fraction of an air/fuel ratio modulation step; and
indicating the degradation condition of the exhaust gas sensor in response to a ratio of the rich-to-lean response duration to the lean-to-rich response duration being greater than an asymmetry threshold that is relative to an axis of symmetry of the rich-to-lean response duration versus the lean-to-rich response duration.

18. The method of claim 17, further comprising:
not indicating the degradation condition of the exhaust gas sensor in response to the rich-to-lean response duration and the lean-to-rich response duration being less than a third calibrated threshold.

* * * * *